(12) United States Patent
Castillo

(10) Patent No.: US 10,939,511 B2
(45) Date of Patent: Mar. 2, 2021

(54) SOLID STATE RADIO FREQUENCY (SSRF) MICROWAVE OVEN FOR AIRCRAFT GALLEY

(71) Applicant: Rockwell Collins, Inc., Cedar Rapids, IA (US)

(72) Inventor: Arnau Castillo, Maarssen (NL)

(73) Assignee: Rockwell Collins, Inc., Cedar Rapids, IA (US)

( * ) Notice: Subject to any disclaimer, the term of this patent is extended or adjusted under 35 U.S.C. 154(b) by 276 days.

(21) Appl. No.: 15/946,636

(22) Filed: Apr. 5, 2018

(65) Prior Publication Data

US 2019/0313486 A1 Oct. 10, 2019

(51) Int. Cl.
*H05B 6/66* (2006.01)
*H05B 6/64* (2006.01)
(Continued)

(52) U.S. Cl.
CPC .......... *H05B 6/666* (2013.01); *B64D 11/04* (2013.01); *H05B 6/642* (2013.01); *H05B 6/6485* (2013.01);
(Continued)

(58) Field of Classification Search
CPC ............... B64D 11/04; B64D 2221/00; H05B 2206/044; H05B 6/642; H05B 6/6485;
(Continued)

(56) References Cited

U.S. PATENT DOCUMENTS 3,692,968 A * 9/1972 Yasuoka ............. H05B 6/6485
219/681
5,558,800 A * 9/1996 Page ........................ H05B 6/72
219/695
(Continued)

FOREIGN PATENT DOCUMENTS

EP 3282818 A1 2/2018

OTHER PUBLICATIONS

Extended EP Search Report dated Sep. 2, 2019 for EP Application No. 19167501.6.
(Continued)

*Primary Examiner* — Dana Ross
*Assistant Examiner* — Joseph W Iskra
(74) *Attorney, Agent, or Firm* — Suiter Swantz pc llo

(57) ABSTRACT

A solid-state radio frequency (RF) microwave oven for an aircraft galley is dimensioned to fit the galley and includes within the oven cavity an array of RF modules disposed on the upper interior surface of the cavity. Each RF module includes one or more RF emitters programmable to heat meals placed within the oven cavity by emitting tunable RF signals. The RF modules may monitor the internal temperature and doneness of the food by detecting returned unabsorbed energy. An oven control module (OCM) may communicate with the aircraft galley network, selectively manage the activation and deactivation of RF modules depending on the food being cooked and its changing internal temperature, and tune emitted RF signals to avoid
(Continued)

interference with aircraft communication systems. Compact heat sinks may be located within the rear of the oven cavity for the removal of excess energy from the oven.

6 Claims, 4 Drawing Sheets

(51) Int. Cl.
*B64D 11/04* (2006.01)
*H05B 6/80* (2006.01)
*H05B 6/68* (2006.01)

(52) U.S. Cl.
CPC ............ *H05B 6/664* (2013.01); *H05B 6/686* (2013.01); *H05B 6/80* (2013.01); *B64D 2221/00* (2013.01); *H05B 2206/044* (2013.01)

(58) Field of Classification Search
CPC ........ H05B 6/664; H05B 6/666; H05B 6/686; H05B 6/80
USPC ........................................................ 219/678
See application file for complete search history.

(56) References Cited

U.S. PATENT DOCUMENTS

| | | | |
|---|---|---|---|
| 6,462,320 B1* | 10/2002 | Fuls | ............ B28B 3/20 219/699 |
| 7,498,549 B2 | 3/2009 | Gallivan et al. | |
| 8,839,527 B2 | 9/2014 | Ben-Shmuel et al. | |
| 9,040,883 B2 | 5/2015 | Ben-Shmuel et al. | |
| 9,215,756 B2 | 12/2015 | Bilchinsky et al. | |
| 9,301,344 B2 | 3/2016 | Ibragimov et al. | |
| 9,332,591 B2 | 5/2016 | Libman et al. | |
| 9,609,692 B2 | 3/2017 | Bilchinsky et al. | |
| 2009/0057302 A1 | 3/2009 | Ben-Shmuel et al. | |
| 2009/0236334 A1 | 9/2009 | Ben-Shmuel et al. | |
| 2012/0111856 A1* | 5/2012 | Nobue | ............ H05B 6/686 219/704 |
| 2015/0312971 A1 | 10/2015 | Ben-Shmuel et al. | |
| 2016/0192446 A1* | 6/2016 | Seddik | ............ G09B 19/0092 219/705 |
| 2017/0240295 A1* | 8/2017 | Ferrer | ............ B64D 11/04 |

OTHER PUBLICATIONS

Michael Wolf, Miele Introduces The Dialog, A High-End Oven Powered By RF Solid State Cooking Technology, The Spoon, https://thespoon.tech/miele-introduces-the-dialog-a-high-end-oven-powered-by-rf-solid-state-cooking-technology/, Aug. 31, 2017, 5 pages.

Liu Zheng, Midea partners with NXP for new smart kitchen appliance, ChinaDaily.com.cn, http://www.chinadaily.com.cn/business/tech/2016-09/28/content_26922231.htm, Sep. 28, 2016, 3 pages.

Goji Food Solutions, Ltd., Volumetric Cooking with Goji Technology, NPX, Jun. 2013, 3 pages.

* cited by examiner

SOLID STATE RADIO FREQUENCY (SSRF) MICROWAVE OVEN FOR AIRCRAFT GALLEY

BACKGROUND

Conventional microwave ovens may be commonly found in aircraft galleys, but there are numerous aircraft-related or aircraft-specific challenges associated with the use of such magnetron-based devices. For example, in order to properly regulate power consumption, the magnetrons must be fully switched on and off. Such power fluctuations not only tax the aircraft's power management and distribution systems, but strain the magnetron itself, adversely affecting its reliability and operating lifespan. Further, magnetron-based microwave cooking requires additional components (e.g., waveguides, stirrer systems for spreading generated radiation, equipment for supplying the magnetron with high-voltage power) that add precious weight and reduce the available space within the oven cavity. Nor is the radiation distribution optimal throughout the oven cavity, resulting in "hotspots" and "coldspots" where food may cook more or less evenly depending upon its placement within the oven. In addition, heat dispersal (e.g., from within the oven cavity) is extremely complicated in a magnetron-generated microwave environment. The heat removal process is complicated further by the lower air pressures associated with aircraft cabins inflight.

SUMMARY

In one aspect, embodiments of the inventive concepts disclosed herein are directed to a solid-state radio frequency (RF) microwave oven for an aircraft galley. The oven housing is dimensioned to fit within galleys of various sizes and includes a cavity for accommodating food to be heated or cooked. The oven includes an array of spaced or grouped RF emitter modules distributed across the upper interior surface of the oven cavity. One or more RF emitter modules or groups thereof may be selectively programmed to heat a particular meal based on, e.g., its size or composition. As the food cooks, the RF modules detect returned energy unabsorbed by the food, estimating and monitoring the internal temperature of the food and its degree of doneness. The RF microwave oven is connected to the aircraft power supply and includes an oven control module (OCM) in communication with the aircraft galley network or galley network controller. The OCM accepts user input and selectively activates or deactivates one or more of the RF modules depending on the selected meals and their monitored internal temperature. Based on the returned energy detected by the RF modules, the OCM may estimate the internal temperature of a meal and deactivate the appropriate RF modules when a selected meal is done. The OCM modulates the frequency of the RF emitters to avoid interference with communications or other RF-based aircraft systems operating at proximate frequencies.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
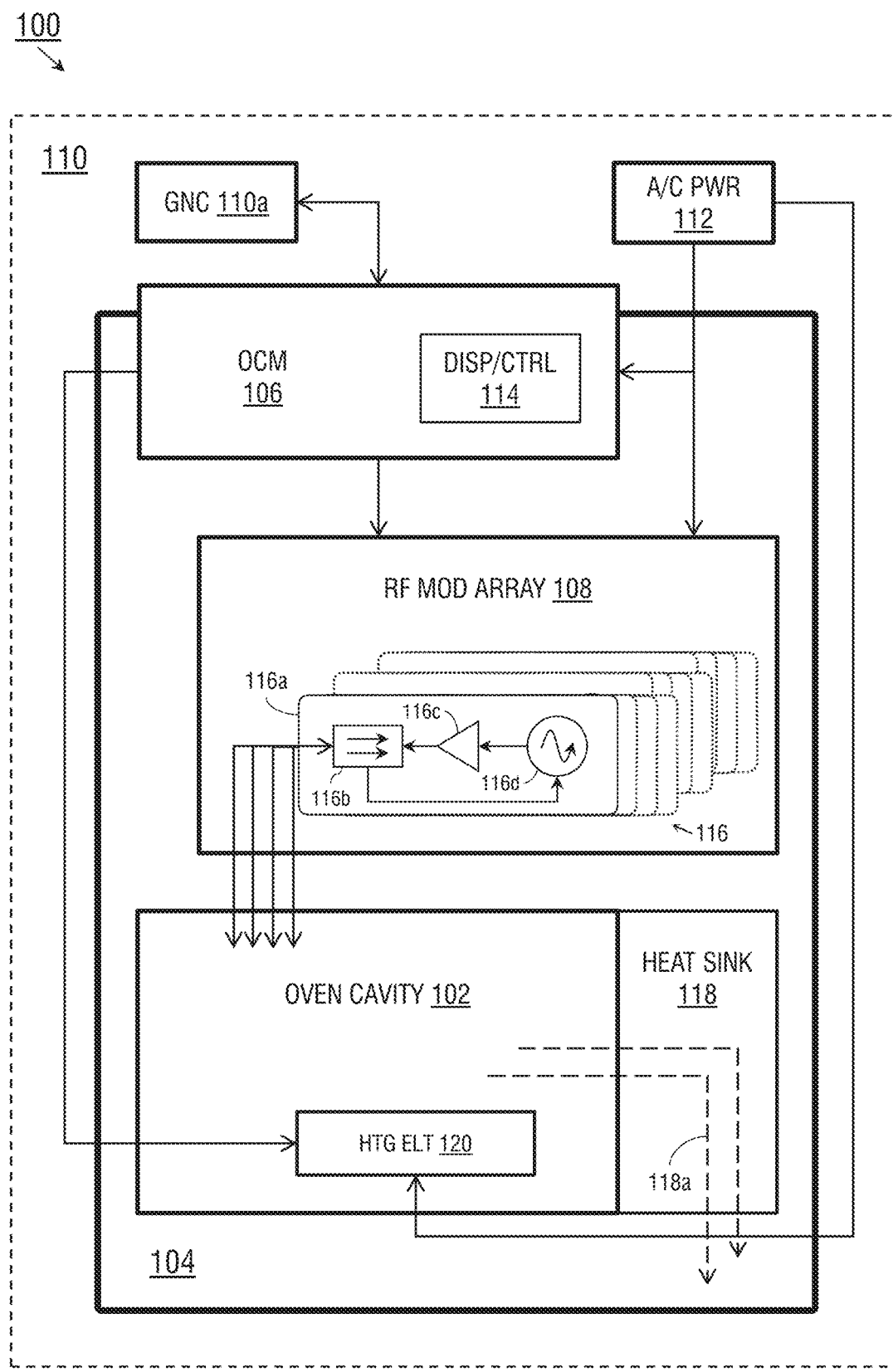
FIG. 1 is a diagrammatic illustration of an exemplary embodiment of a solid-state RF microwave oven according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a solid-state RF-based microwave oven for an aircraft galley. The RF microwave oven saves weight and increases internal capacity by replacing the conventional magnetron with arrays of individually controllable RF emitters that eliminate hotspots and coldspots associated with magnetron-based microwaves. In addition, the RF microwave oven simplifies heat dispersal and provides for simultaneous cooking of multiple means including diverse food types at optimal service times, without undercooking or overcooking individual meal components.

Referring to FIG. 1, an exemplary embodiment of a solid-state radio frequency (RF) microwave oven 100 for an aircraft galley may include an oven cavity (102) set into a housing (104), an oven control module 106 (OCM), and an RF module array (108) set into an interior surface of the oven cavity 102. For example, the RF module array 108 may be set into the upper or top surface of the oven cavity 102. The housing 104 may be externally dimensioned to fit galley of an aircraft (110), e.g., as a standalone device or as a galley insert (GAIN). The OCM 106 may be connected to one or more aircraft networks via a galley network controller 110a (GNC), which may monitor and manage power distribution to, and consumption by, the RF microwave oven 100. For example, the RF module array 108 may be connected to, and powered by, an aircraft power supply (112) providing low-voltage to the RF modules. However, unlike magnetron-based microwave ovens, the RF microwave oven 100 may not require additional equipment to provide the high-voltage power supply needed for magnetron operations. The OCM 106 may include protection circuits as well as a display/control subsystem (114) for controlling the operation of the RF module array 108. The display/control subsystem 114 may include a display screen or like surface on the exterior surface of the housing 104 and a keypad, touchscreen, or similar means of accepting control input from a user. For example, the user may indicate the type or volume of food/s to be cooked, from which the OCM 106 may infer an appropriate cooking time and intensity (e.g., how many individual RF modules (116) of the RF module array 108 are to be activated, such as the RF modules corresponding to a desired portion of the oven cavity 102). The OCM 106 may use this information to monitor the internal temperature of the food (e.g., based on returned energy emitted by the RF modules 116 but unabsorbed by the food) in order to determine whether cooking is complete.

Each individual RF module 116 may include one or more RF emitters, or "chips" (116a). For example, each RF "chip" 116a may be a closed-loop RF emitter incorporating oscillators (116b), amplifiers (116c), and directional couplers (116d) optimized for ideal emission frequency and phase. For example, the transmission of the RF chips 116a may be tuned so as not to interfere with aircraft wireless communications (e.g., 2.4 GHz aircraft WiFi) or other RF devices operating onboard the aircraft. Different combinations of RF chips 116a or RF modules 116 may be simultaneously adjusted for fine control over the cooking of multiple and diverse foods at once.

The RF microwave oven 100 may include one or more heat sinks (118) for disspating heat (118a) generated within the oven cavity 102 by the operation of the oven. For example, the heat sinks 118 may include fans within the oven cavity 102 for circulating air over the RF module array 108 and through exhaust outlets (not shown) within the oven cavity 102. Alternatively, the heat sinks 118 may include water-cooled or liquid-cooled systems by which heat within the oven cavity 102 is transferred to fluids circulated through the cavity and removed from the circulated fluid external to the housing 104.

In some embodiments, the RF microwave oven 100 may be a multimode oven incorporating internal heating elements (120) in addition to the RF module array 108. For example, meals may be heated via the RF module array 108 or via the heating element 120, or by sequential application of both RF modules and the heating element. The heating element 120 may be disposed within the oven cavity 102 and include a fan (not shown) for circulating the heated air throughout the cavity interior.

Figure 2A:
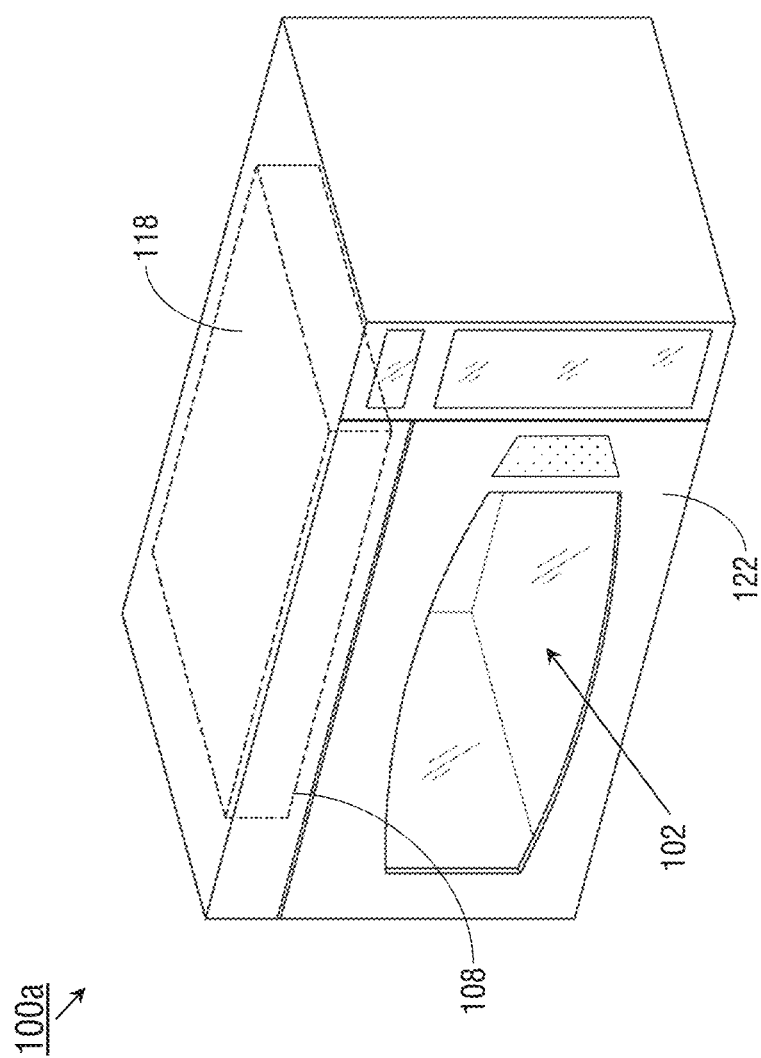
FIGS. 2A and 2B are isometric views of the oven of FIG. 1.
Figure 2B:
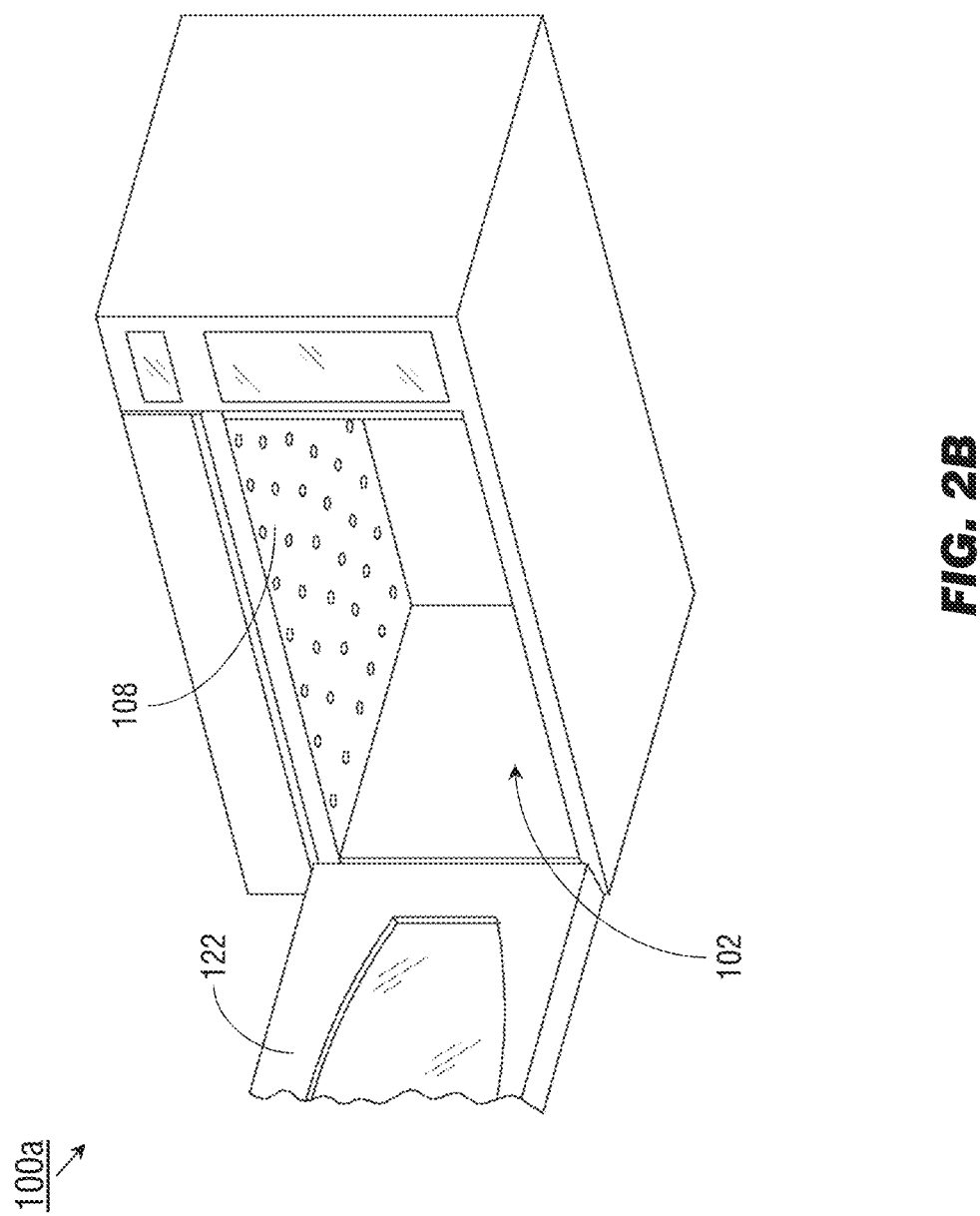

Referring now to FIGS. 2A and 2B, the RF microwave oven 100a may be implemented and may operate similarly to the RF microwave oven 100 of FIG. 1, except that the oven cavity 102 of the RF microwave oven 100a may be accessible by a hinged, latched, or sliding door (122), through which meals may be inserted into and removed from the oven cavity. For example, the RF module array (108) of the RF microwave oven 100a may be disposed along the top or upper interior surface of the oven cavity 102. Heat sinks (118) may similarly be positioned along the upper interior surface at the rear of the oven cavity 102 (e.g., distal to the door 122).

Figure 3:
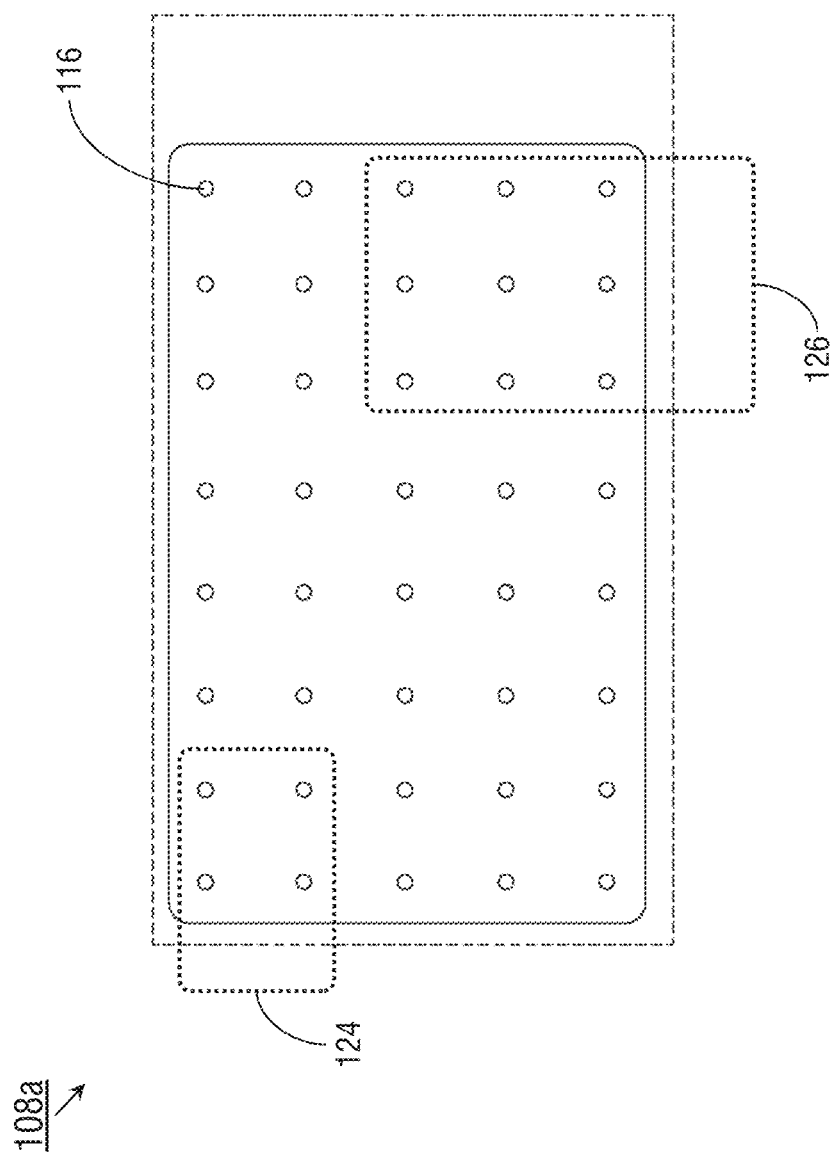
FIG. 3 illustrates an RF module array of the oven of FIG. 1.

Referring to FIG. 3, the RF module array 108a may be implemented and may function identically to the RF module array 108 of FIG. 2B. The individual RF modules (116) of the RF module array 108a may be evenly spaced around the upper surface of the oven cavity (102, FIG. 2A) such that a user may (e.g., via the display/control system 114, FIG. 1) adjust the operation of a single RF module (116) or a proximate group of RF modules (124, 126) corresponding to a specific portion or region of the opposing surface of the oven cavity (e.g., the bottom surface). In this way, the RF microwave oven 100a can adjust individual cooking temperatures and times to optimize the simultaneous cooking of multiple meals including different types of food without overcooking or undercooking any individual components, e.g., by adjusting individual or collective RF modules (116, 124, 126) based on the placement of different food types within the oven cavity 102. For example, the RF microwave oven 100a may be programmed (e.g., via the display/control system 114) to simultaneously cook two specific meals or meal components via the grouped RF modules 124, 126. As the meals absorb energy emitted by the grouped RF modules 124, 126, their internal temperatures rise and the meals absorb less energy. By detecting the amount of RF energy returned to the grouped RF modules 124, 126, the RF microwave oven 100a may estimate and monitor the internal temperatures of each meal as it cooks, deactivating one or more RF modules of the group 124 so that the corresponding meal does not overcook.

As will be appreciated from the above, systems and methods according to embodiments of the inventive concepts disclosed herein may simplify power management and distribution through, e.g., a galley network controller (GNC) by modulating power requirements of the RF microwave oven to a substantially constant level, as opposed to the full-on/full-off switching associated with magnetron-based units. Further, as this full-on/full-off switching creates a strain on the magnetron (e.g., particularly on its central filament) the operating lifespan of the RF microwave oven may be significantly increased over its magnetron-based counterpart. In addition, the individual and group adjustability of RF modules and chips not only eliminates hotspots and coldspots within the oven, but allows the operating frequencies of the RF modules and chips to be tuned to as not to interfere with any RF-based aircraft communications on proximate frequencies. Finally, the removal of magnetron-specific components such as the stirrer system and waveguides not only reduces weight, but allows for a greater oven cavity volume and capacity for a comparably sized exterior housing.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A solid-state radio frequency (RF) microwave oven for an aircraft galley, comprising:
    a housing dimensioned to fit the aircraft galley;
    a cavity set within the housing, the cavity capable of accommodating food to be heated;
    an array of RF modules disposed on a first interior surface of the cavity in a spaced apart relationship, each RF module comprising one or more RF emitters configured to:
        heat the accommodated food by emitting at least one RF signal at a first frequency;
        and
        detect returned energy based on the emitted RF signal and associated with the accommodated food;
    a power source coupled to the array of RF modules and to a power supply of the aircraft;
    at least one heat sink coupled to one or more of the first interior surface and a second interior surface of the cavity, the heat sink configured to remove heat from the cavity;
    and
    an oven control module (OCM) coupled to the array of RF modules and to a network controller associated with the aircraft galley and configured for communication with one or more aircraft networks, the OCM including at least one control processor configured to:
        accept control input from a user;
        estimate at least one temperature of the accommodated food based on the detected returned energy;
        selectively activate or adjust one or more first RF modules of the array of RF modules based on at least one of the control input and the estimated temperature;
        and
        modulate the at least one first frequency.

2. The solid-state RF microwave oven of claim 1, wherein the at least one heat sink includes at least one first fan disposed within the cavity and configured to circulate air over the array of RF modules.

3. The solid-state RF microwave oven of claim 1, wherein the at least one heat sink includes at least one coolant circulation system including one or more pipes configured to circulate a liquid coolant into the cavity and through the outlets.

4. The solid-state RF microwave oven of claim 1, wherein:
    the one or more first RF modules are associated with a first portion of a bottom surface of the cavity;
    and
    one or more second RF modules are associated with at least one second portion of the bottom surface.

5. The solid-state RF microwave oven of claim 1, further comprising:
    at least one control unit coupled to an exterior surface of the housing and to the OCM, the control unit including at least one of:
        a display surface configured to display at least one state of the oven;
        and
        a touch-sensitive surface configured to receive the control input from the user.

6. The solid-state RF microwave oven of claim 1, wherein the oven is a multimode oven further comprising:
    at least one internal heating element disposed within the cavity and coupled to the OCM;
    and
    at least one second fan disposed within the cavity and configured to heat the cavity by circulating air over the internal heating element;
    the OCM configured to selectively activate the at least one internal heating element in sequence with one or more first RF modules of the array of RF modules based on at least one of the control input and the estimated temperature.

* * * * *